(12) United States Patent
Block et al.

(10) Patent No.: US 7,573,987 B1
(45) Date of Patent: Aug. 11, 2009

(54) APPARATUS AND METHOD FOR CONTROLLING INTERACTION BETWEEN A MULTI-MEDIA MESSAGING SYSTEM AND AN INSTANT MESSAGING SYSTEM

(75) Inventors: Frederick Peter Block, Westminster, CO (US); Gordon Richards Brunson, Broomfield, CO (US); Jeffrey Forest McElroy, Columbia, SC (US)

(73) Assignee: Avaya Inc., Basking Ridge, NJ (US)

( * ) Notice: Subject to any disclaimer, the term of this patent is extended or adjusted under 35 U.S.C. 154(b) by 785 days.

(21) Appl. No.: 11/051,921

(22) Filed: Feb. 5, 2005

(51) Int. Cl.
*H04M 11/00* (2006.01)

(52) U.S. Cl. .......... 379/88.13; 379/88.18; 379/265.09; 455/466

(58) Field of Classification Search .............. 379/88.13, 379/52, 88.16, 265.09
See application file for complete search history.

(56) References Cited

U.S. PATENT DOCUMENTS

| | | | |
|---|---|---|---|
| 6,697,474 B1 * | 2/2004 | Hanson et al. | 379/201.01 |
| 7,287,009 B1 * | 10/2007 | Liebermann | 705/42 |
| 2004/0205175 A1 * | 10/2004 | Kammerer | 709/223 |
| 2005/0018819 A1 * | 1/2005 | Schmidt et al. | 379/88.13 |
| 2005/0094776 A1 * | 5/2005 | Haldeman et al. | 379/52 |
| 2005/0198096 A1 * | 9/2005 | Shaffer et al. | 709/200 |
| 2006/0052127 A1 * | 3/2006 | Wolter | 455/519 |

* cited by examiner

*Primary Examiner*—Fan Tsang
*Assistant Examiner*—Akelaw A Teshale
(74) *Attorney, Agent, or Firm*—John C. Moran

(57) ABSTRACT

A method and apparatus provide access to a plurality of instant messaging systems via a multi-media messaging system by receiving an incoming communication by the multi-media messaging system for a user of the multi-media messaging system; determining a presence of the user on one of the plurality of instant messaging systems; and establishing instant messaging communication between an originator of the incoming communication and the user. The method and apparatus also provide communication for the user via a multi-media messaging system with a plurality of instant messaging systems by broadcasting a presence of the user on the multi-media messaging system to the plurality of instant messaging systems; and establishing instant messaging communication between a person using one of the plurality of instant messaging systems and the user via the multi-media messaging system.

23 Claims, 8 Drawing Sheets

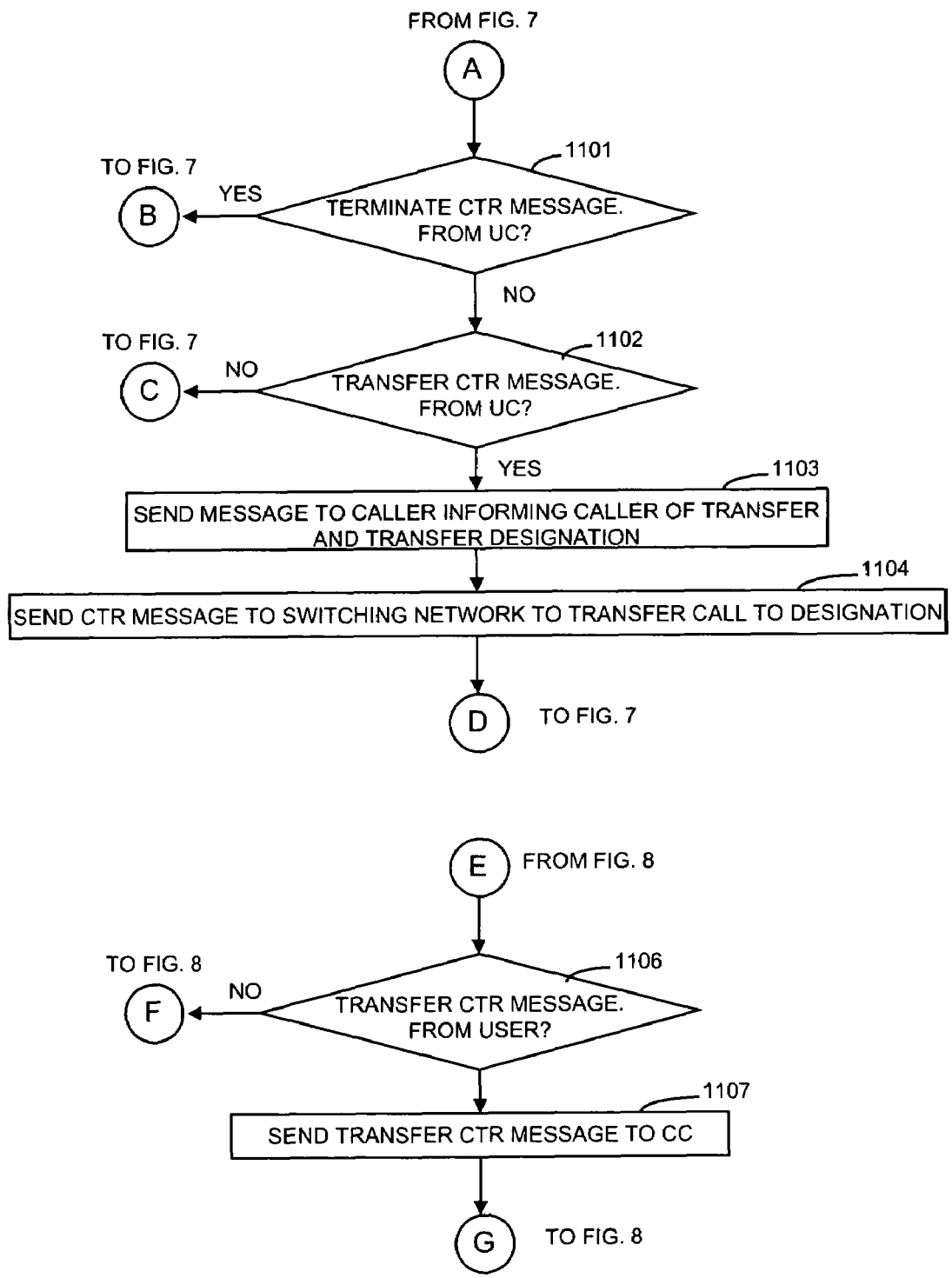

US 7,573,987 B1

APPARATUS AND METHOD FOR CONTROLLING INTERACTION BETWEEN A MULTI-MEDIA MESSAGING SYSTEM AND AN INSTANT MESSAGING SYSTEM

TECHNICAL FIELD

This invention relates to messaging systems.

BACKGROUND OF THE INVENTION

In the prior art, many types of systems are known that allow real time communication between parties. The most common type of real time communication is via a telephone call, whether it is wireless or wired. In addition, individuals can engage in real time communication by utilizing telecommunication devices for the deaf (also referred to as TDD or TTY terminals), and by utilizing instant messaging services. In addition, multi-media messaging is also known that allows real time communication. In addition, it is also known to utilize short message signaling (SMS) to achieve real time messaging. However, SMS (also referred to as text messaging via cellular or wireless telephones) can be utilized for non-real time communication.

An individual may have multiple ways of engaging in real time communication by having multiple land linked telephones and cellular telephones as well as multiple instant messaging accounts and may utilize a TTY terminal. However, the problem still exists within the prior art that the user may not be utilizing the type of communication media that another party is utilizing when the other party attempts to establish communication. A good example of this is the case where a commuter is stalled in traffic on a freeway and the only viable communication media is their cellular telephone. They can place calls directly to individuals via the cellular telephone and they can also pick up voice messages in a voice messaging system. However, for a commuter driving a car it is difficult to utilize a personal computer or a personal digital assistant to establish a presence so as to receive instant messages or establish TTY communication.

SUMMARY OF THE INVENTION

A method and apparatus provide access to a plurality of instant messaging systems via a multi-media messaging system by receiving an incoming communication by the multi-media messaging system for a user of the multi-media messaging system; determining a presence of the user on one of the plurality of instant messaging systems; and establishing instant messaging communication between an originator of the incoming communication and the user.

A method and apparatus provide communication for a user via a multi-media messaging system with a plurality of instant messaging systems by broadcasting a presence of the user on the multi-media messaging system to the plurality of instant messaging systems; and establishing instant messaging communication between a person using one of the plurality of instant messaging systems and the user via the multi-media messaging system.

BRIEF DESCRIPTION OF THE DRAWING

FIGS. 7, 8 and 11 illustrate, in flowchart form, operations performed for the implementation of the embodiments of FIGS. 2 and 3.

DETAILED DESCRIPTION

In one embodiment of the invention, a party (also referred to as the contacting party) attempting to contact another party (also referred to as the contacted party) ends up with the communication being handled by a multi-media messaging system (also referred to as a converged communications system). The multi-media messaging system realizes that the contacted party is instant message present and initiates an instant message (IM) session with the contacted party and indicating as much information as possible about the contacting party. If the contacted party wishes to communicate with the contacting party, the text instant messages sent by the contacted person are conveyed to the contacting party via text to speech capabilities. Further, the embodiment allows a limited dialog for the contacted party consisting of questions posed by IM messages requiring yes or no answers that may be detected by speech recognition or numerical responses from the contacting party. In another embodiment, the contacted party utilizes the SMS type signaling to extend the dialog capabilities. Further, the embodiment allows both the contacting and contacted parties to issue control messages to the multi-media messaging system. For example, the contacted party could send a message at any time to change the communication media type, the terminal type or both.

Another embodiment allows a multi-media messaging user (contacted party) while being logged onto the multi-media messaging system to have the multi-media messaging operations interrupted by another user (contacting party) who sends a text IM message to the user, and the multi-media messaging system interrupts the multi-media messaging mail session to indicate to the user that they have an IM message. The user may then utilize pre-defined responses or SMS type responses to communicate with the IM user or communicate with other operations.

Figure 1:
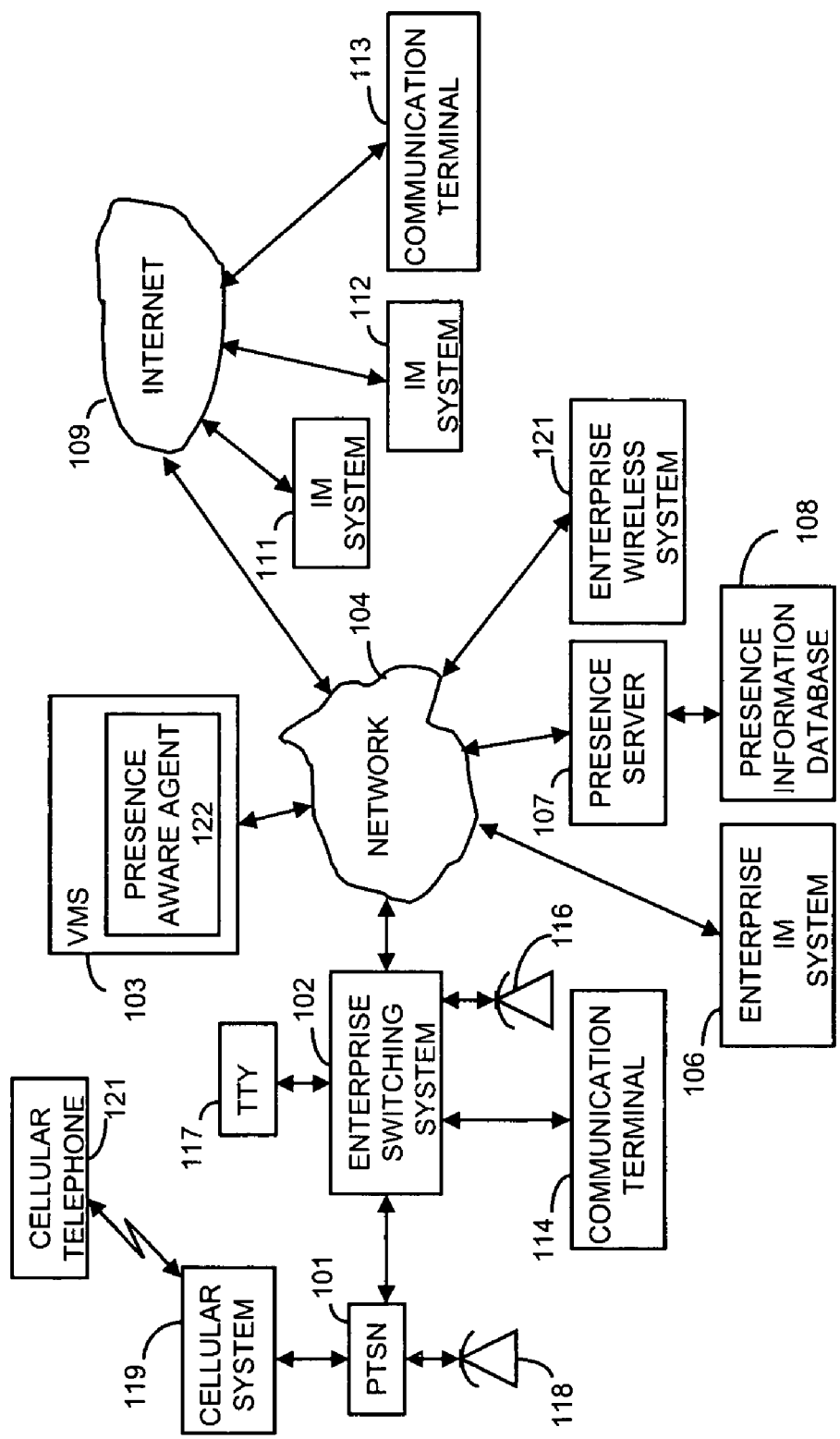
FIG. 1 illustrates, in block diagram form, an embodiment for implementing the invention.

FIG. 1 illustrates an embodiment for performing the invention. Public telephone system network 101 interconnects communication devices such as telephone 118 to enterprise switching system 102. Enterprise switching system 102 provides voice and other types of media communication capabilities for communication terminal 114, telephone 116 and TTY terminal 117. One skilled in the art would realize that there could be a plurality of each of these types of devices. Enterprise switching system 102 thus allows a telephone such as telephone 116 to place a call to a telephone connected to the public telephone switching network 101 and to respond to messages on multi-media messaging system such as voice messaging system 103 (also referred to as voice mail system 103). Further, enterprise switching system 102 allows a communication terminal such as communication terminal 114 access to IM messages via enterprise IM system 106 or a public IM system such as 111 or 112 interconnected to Internet 109. Internet 109 is illustrated as connecting to network 104, which is an intra-entity network, via a firewall as is well known to those skilled in the art. Note, Internet 109 could also directly connect to voice messaging system 103. In addition, a communication terminal such as communication terminal 113 may also gain access to the intra-switching network 104 via Internet 109 by utilizing security procedures well known to those skilled in the art. Cellular system 119 provides public cellular communication for a user. In addition, enterprise wireless system 121 also provides wireless service normally within a geographical location of an entity. Enterprise IM system 106 provides a secure IM communication means for users within an entity.

A user assigned to enterprise switching system 102 may be present on cellular system 119, public telephone switching network 101, enterprise IM system 106, enterprise wireless system 121, or one of the public IM systems as well as being present on a terminal directly connected to enterprise switching system 102. Presence server 107 may be used to receive information concerning on which IM system the user is present, and this information may be stored in presence information database 108. The operations of these systems with respect to user's presence is detailed in U.S. Patent Application Publication 2004/0141594 which is hereby incorporated by reference.

Figure 2:
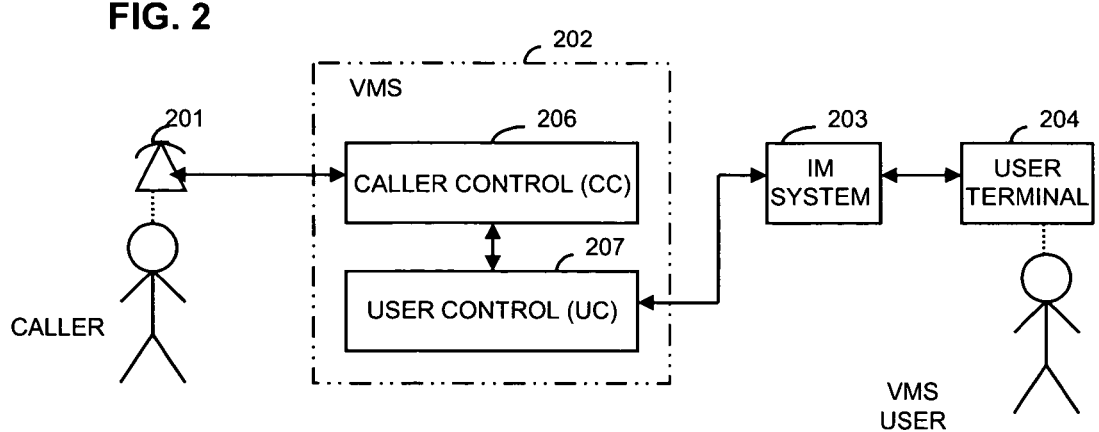
FIGS. 2-6 illustrate embodiments of the invention.
Figure 3:
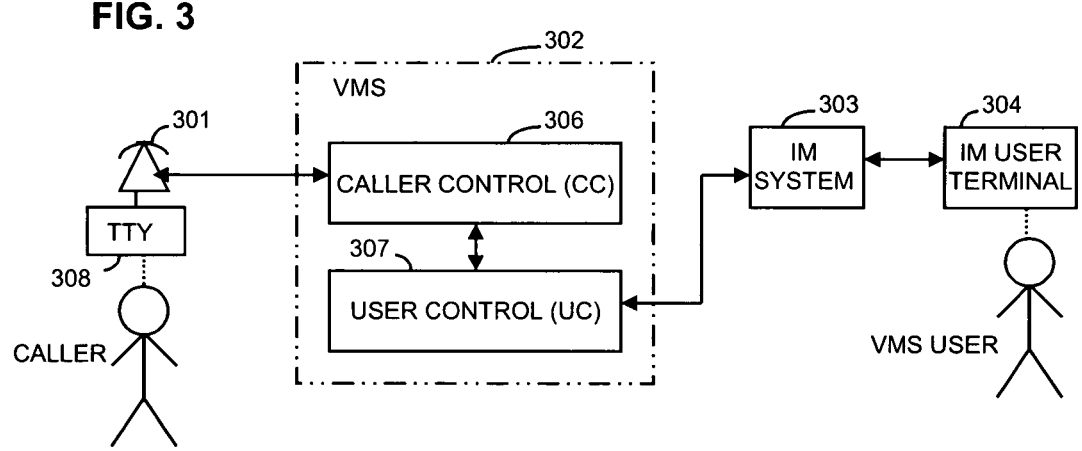
Figure 4:
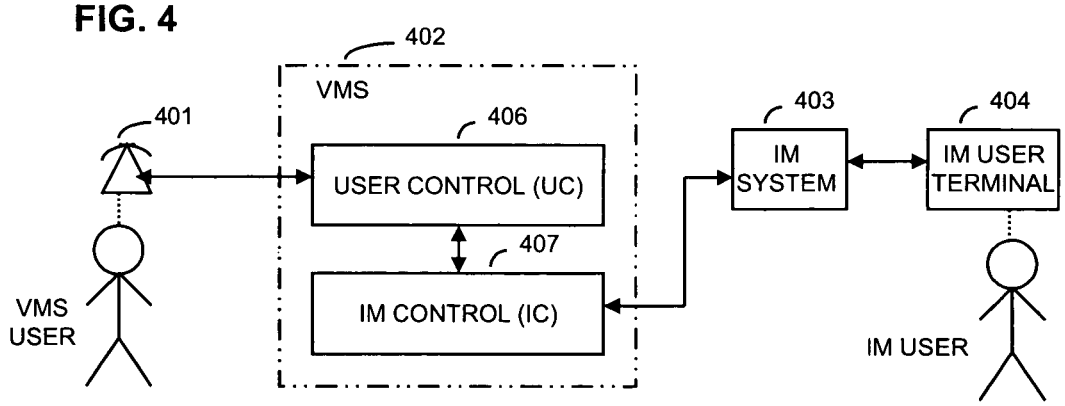
Figure 5:
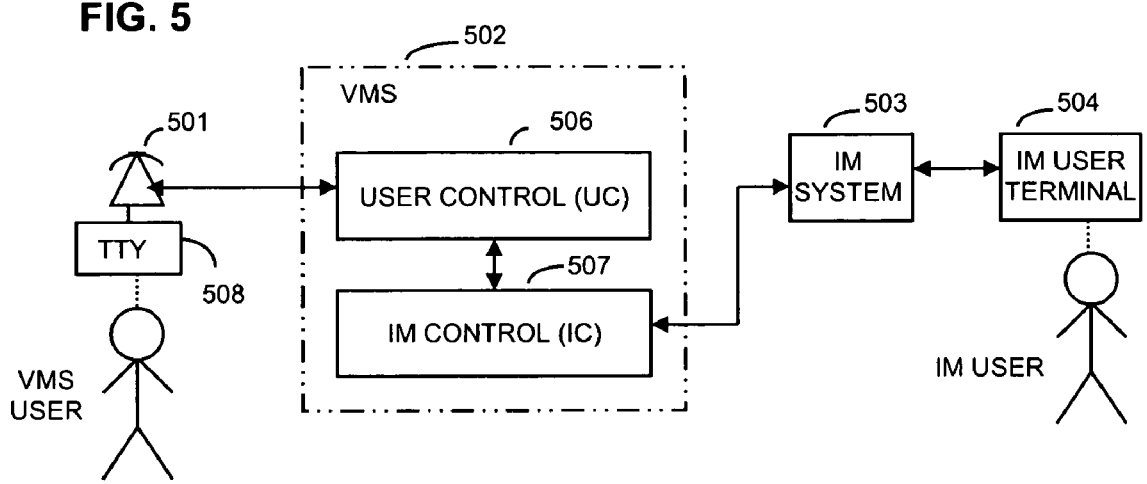

To better understand the operations of the various embodiments illustrated in FIG. 1, FIGS. 2-6 each simplifies one of the possible embodiments of FIG. 1. FIGS. 2 and 3 illustrate embodiments where the VMS user is utilizing user terminal 204 or 304 on IM system 203 or 303 when the voice messaging system receives a call for the VMS user from a caller. In FIGS. 4-5, the VMS user is utilizing a telecommunication terminal to obtain their messages stored on a voice messaging system. An IM user becomes aware of their presence on the voice messaging system and engages in an IM session with the VMS user.

Figure 6:
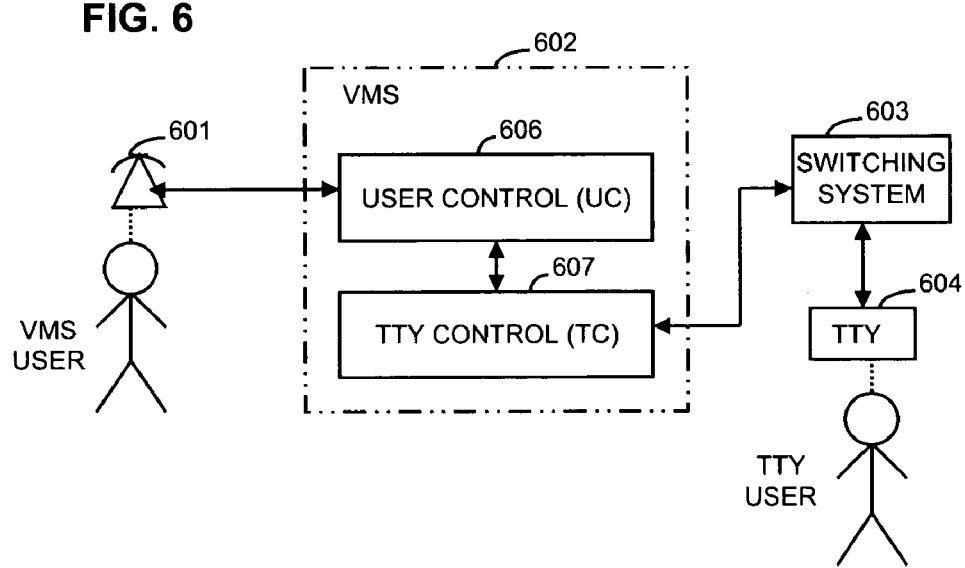

FIG. 6 illustrates an embodiment where the VMS user is utilizing a telecommunication terminal to access their messages stored on voice messaging system 602, and a TTY user is leaving a message on the voice messaging system for the VMS user. The voice messaging system sets up communication between the TTY user and the VMS user.

Consider now FIG. 2 in greater detail. FIG. 2 illustrates an embodiment where the VMS user is active on an IM system such as enterprise IM system 106, IM system 111, or IM system 112 when a caller utilizing telephone 201 contacts voice messaging system 202 with respect to the VMS user. Telephone 201 may be a cellular telephone connected to cellular system 119, a telephone set connected to public telephone switching network 101, or an internal telephone connected to enterprise switching system 102 such as telephone 116. Although described as simple telephone sets, one skilled in the art would readily realize that these telephones could be implemented utilizing a variety of voice technology such as voice over IP or various proprietary digital protocols.

When the VMS user becomes active on user terminal 204, IM system 203 publishes the presence of the user directly to presence server 107 so that this presence can be stored in the presence information database 108, where this information can be accessed by voice messaging system 103. Note, if IM systems 111 and 112 can not publish the presence of the user directly to presence server 107, voice messaging system 103 may access IM systems 111 and 112 to ascertain whether the user is present on one of these systems.

When the call is received from the caller via telephone 201, caller control 206 via user control 207 determines whether or not the VMS user is present on IM system 203. If the answer is yes, caller control 206 may send a message to the caller asking if the caller wants the voice messaging system to find the VMS user and for the caller to communicate via a modified text format. If the caller chooses not to communicate via the modified text format, voice messaging system 202 may allow the caller the option of leaving a voice message.

If the caller wishes to proceed, caller control 206 requests that user control 207 send a message to the VMS user asking if the VMS user wants to communicate with the caller. The message includes information to identify the caller. Voice messaging system 103 obtains the identification information using techniques well known to one skilled in the art. User control 207 sends this message to user terminal 204 via IM system 203. The VMS user may or may not respond to the message from user control 207. Or the VMS user may respond that they do not wish to communicate. In either case, user control 207 relays the indication back to caller control 206 which transmits terminate information to the caller if the user terminal does not respond or does not wish to engage in communication with the caller. Once again, voice messaging system 202 may allow the caller the option of leaving a voice message if the VMS user does not respond or responds that they do not wish to engage in communication with the caller.

If the VMS user wants to change the media of communications, the VMS user transmits a control message via user terminal 204 to user control 207 to have the call transferred to another destination such as another type of user terminal, a call coverage path, etc. The other type of terminal could be a cellular telephone or other type of type telephone set used by the VMS user. If the VMS user wants to communicate using IM messaging, the VMS user determines the format that will be utilized in communication with the caller. The VMS user may predetermine this format or may determine it at the time that the VMS user is contacted that a caller wishes to communicate. The possible formats include but are not limited to (1) the VMS user proposing questions to the caller which the caller can respond with a simple yes, no or don't know answer; (2) the VMS user poses a question which may be answered by a predetermined multiple choice format by the caller; and (3) the VMS user poses questions to the caller which the caller responds utilizing voice communication with the voice being converted by a voice-to-text conversion mechanism or the voice is encoded into an audio file which is transmitted to user terminal 204 to be played as audio to the VMS user. Those skilled in the art could readily envision other formats that could be utilized in the communication between the caller and the VMS user of FIG. 2. Those skilled in the art would realize that the VMS user may not wish to engage in a lengthy communication and may just send a quick text response to the caller and terminate the communication.

If the VMS user responds via user control 207 to caller control 206 that the VMS user wishes to communicate with the caller, caller control 206 specifies the format that will be utilized for the communication to the caller. This format as previously discussed is either predefined or received from the VMS user. Caller control 206 and user control 207 then relay messages back and forth between the caller and the VMS user and reformat the messages as needed. For example, if a simple yes and no format is being used, the caller may respond to the VMS user's questions by pushing a key on a multi-frequency dialing tone pad. Caller control 206 is responsive to the resulting multi-frequency dialing tones to convert this to a text message which is relayed to user terminal 204 via user control 207 and IM system 203. Similarly, the text messages being received from the VMS user are converted to audio by caller control 206. In one format, the VMS user may pose questions by voice messages which are encoded by user terminal 204 and sent as encoded audio files to caller control 206 via user control 207 and IM system 203. Caller control 206 is responsive to these encoded audio files to convert the files to audio to be presented to the caller via telephone 201.

During the exchange of messages between the VMS user and the caller, caller control 206 monitors the caller for a termination indication or an abandonment of the call. If either of these conditions arise, caller control 206 advises the VMS user via user control 207 and IM system 203 of the condition.

Similarly, user control 207 monitors the presence of user terminal 204 on IM system 203 and also whether the user indicates that they wish to terminate the communication. If either of these conditions arise, user control 207 informs the caller via caller control 206 of the condition.

The embodiment illustrated in FIG. 3 is similar to that illustrated in FIG. 2 with elements 301-307 performing similar operations to those performed by elements 201-207 of FIG. 2. The embodiment illustrated in FIG. 3 differs from the embodiment of FIG. 2 in that the caller is utilizing TTY terminal 308 for the communication with voice messaging system 302. The format of the communication of FIG. 3 is envisioned to be primarily text based with both the VMS user and the caller preparing text messages. In alternative embodiments, the text message from the caller may be converted to audio information and presented to the VMS user as an audio output after being encoded and then subsequently decoded. Similarly, VMS user may engage in voice responses which are subsequently converted before being presented on TTY 308 to the caller.

FIGS. 4 and 5 illustrate embodiments where the VMS user has logged into a voice messaging system to receive their messages using either a telephone or a TTY terminal. While the VMS user is logged into the voice messaging system, the voice messaging system broadcasts the presence of the VMS user to IM systems (illustrated in FIGS. 4 and 5 as blocks 403 and 503, respectively). In FIG. 4, an IM user utilizing IM user terminal 404 then communicates to IM control 407 via IM system 403 that the IM user wants to establish communication with the VMS user. The IM message from the IM user is conveyed to the VMS user via IM control 407, user control 406, and telephone set 401. The message is reformatted so that the VMS user can understand it. The IM message from the IM user may be a text message or an encoded audio file. In either case, user control 406 reformats this message to audio so that the VMS user can understand it. Voice messaging system 402 may give the VMS user the option of whether or not to communicate with the IM user. If this option is available and selected by the VMS user, a terminate control message is transmitted to the IM user via user control 406 and IM control 407. If the VMS user wishes to communicate with the IM user, user control 406 and IM control 407 allow the communication to take place between the two users and provide the proper reformatting of the messages. In addition, user control 406 monitors telephone 401 for a terminate control message or a hang-up. If one of these conditions occurs, user control 406 requests that IM control 407 inform the IM user of the condition. IM control 407 performs a similar task with respect to the IM user, and if a condition of termination or abandonment occurs, informs the VMS user via user control 406. One of the conditions that can arise is that the IM user terminal 404 is no longer present on the IM system 403. In addition, the IM user may transmit a signal indicating that they wish to cease communication.

FIG. 5 illustrates an embodiment that is similar to that of FIG. 4 with elements 501-507 performing similar tasks to those performed by elements 401-407. Within the embodiment of FIG. 5, the VMS user is utilizing TTY terminal 508 to obtain the user's message from voice messaging system 502. The operations of formatting are similar to those provided by the embodiment of FIG. 3.

FIG. 6 illustrates an embodiment where the VMS user is obtaining their messages from voice messaging system 602 when a call for the VMS user is transferred to voice messaging system 602 from the caller who is utilizing TTY terminal 604. TTY control 607 requests via user control 606 whether the VMS user wants to communicate with the TTY user. If the VMS user wishes to communicate with the TTY user, communication is established.

During communication, the TTY user sends and receives information utilizing TTY terminal 604. The VMS user transmits audio information either voice or multi-frequency dialing tones utilizing telephone 601. If the VMS user communicates using voice, user control 606 converts the voice to text before transferring it to TTY 604 via TTY control 607 and switching system 603. Note, that switching system 603 can be any of a number of well known telecommunication switching systems that are able to establish communication with voice messaging system 602.

Another alternative embodiment allows the VMS user to have pre-selected messages stored by user control 606. The VMS user utilizes telephone 601 to select these messages which are then transmitted to TTY 604 via TTY control 607 and switching system 603. Messages received from TTY 604 are reformatted from text to audio by blocks 606 and 607. Either block 606 or block 607 can perform the formatting of messages during the exchange of information between the VMS user and TTY user. In addition, block 606 and 607 monitor their respective terminals to determine if the user has indicated a desire to terminate the call or the user has abandoned the call. The conditions are then transmitted to the other user.

Figure 7:
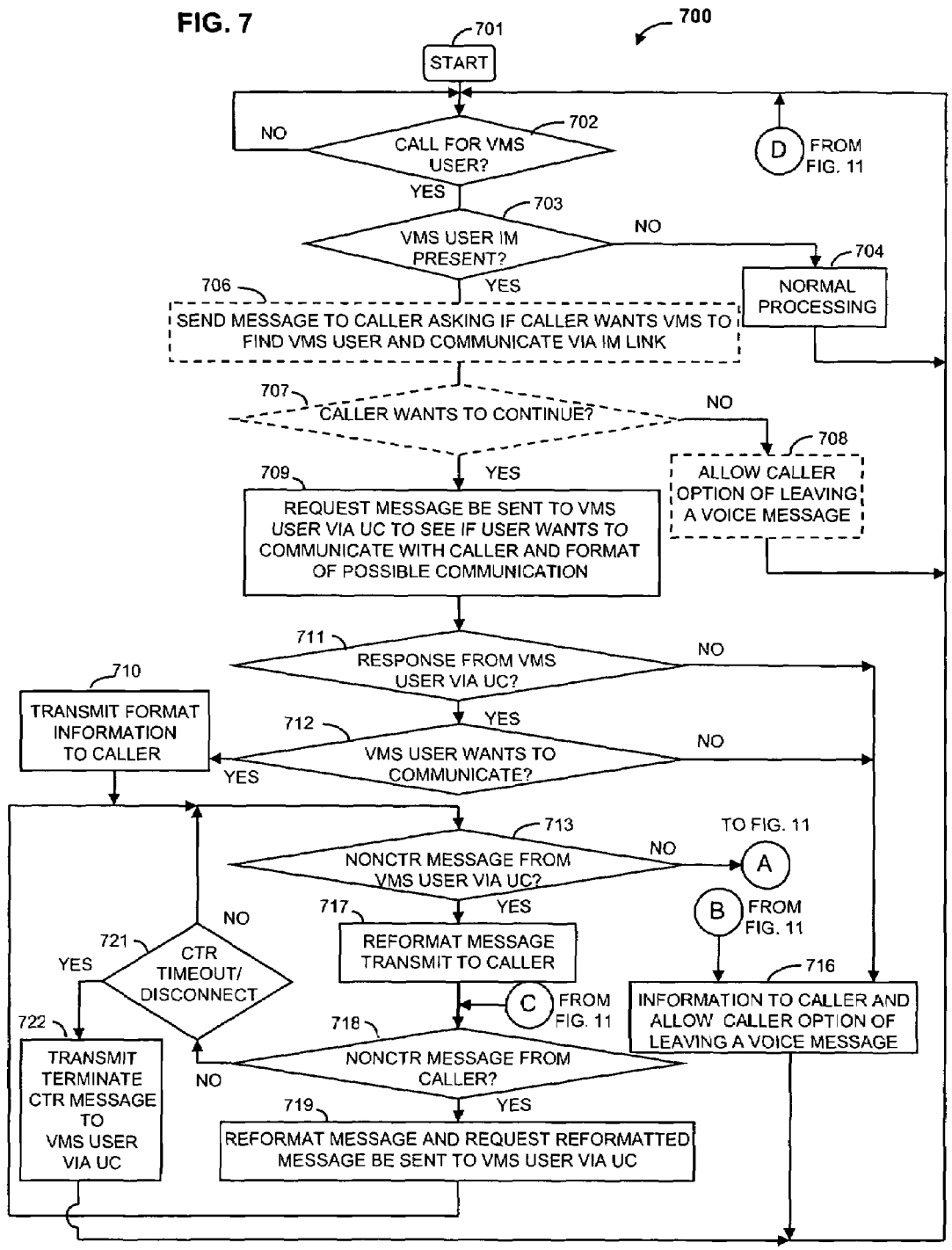
Figure 8:
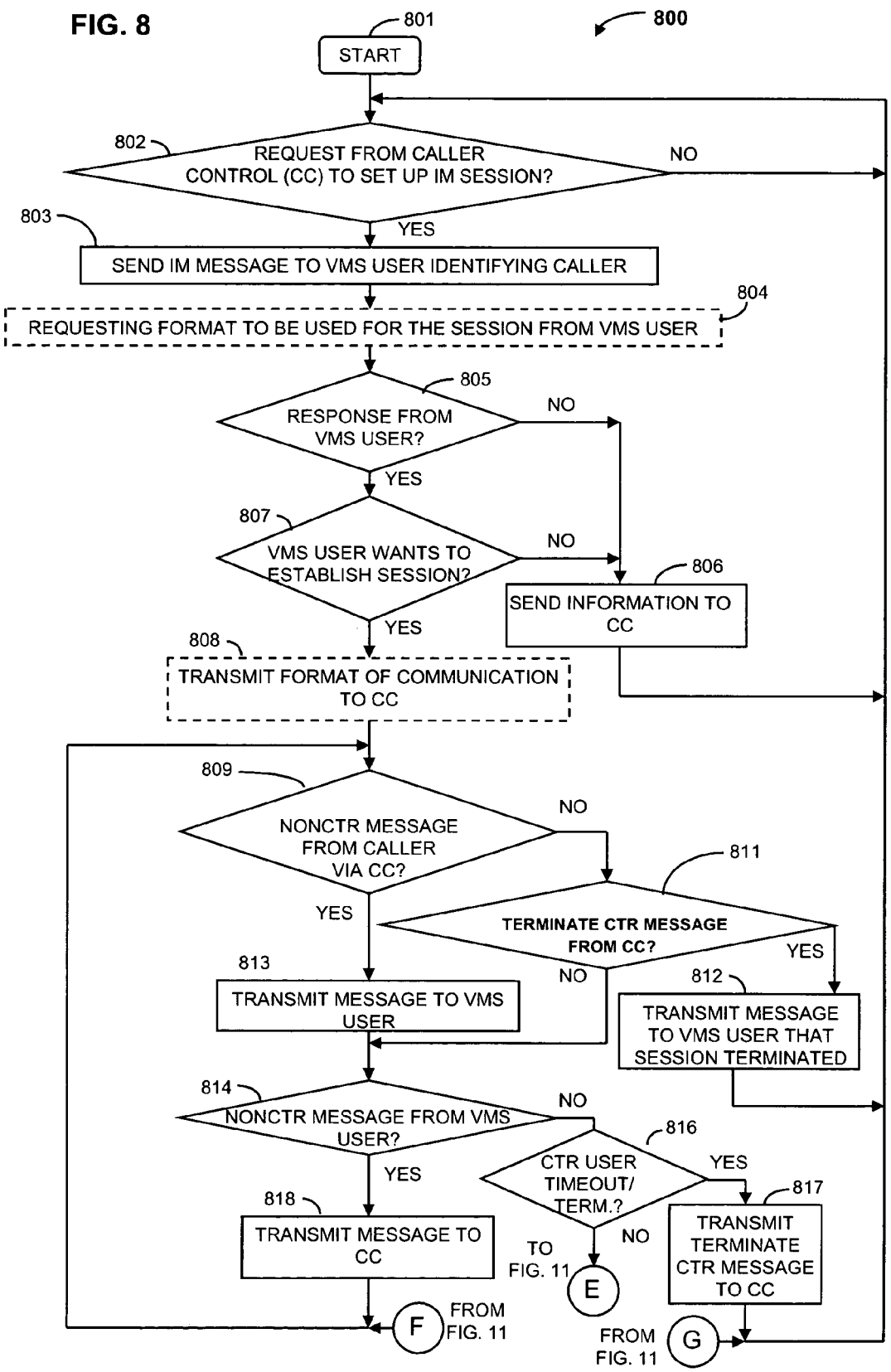

FIG. 7 illustrates an embodiment of the operations that may be performed by caller control 206 of FIG. 2 or caller control 306 of FIG. 3. FIG. 8 is an embodiment of the operations that may be performed by user control 207 of FIG. 2 or user control 307 of FIG. 3. One skilled in the art would readily realize that the sequence illustrated on FIGS. 7 and 8 could be modified and interchanged. In addition, the operations illustrated on FIGS. 7 and 8 could be inter-exchanged between the two flowcharts.

In FIG. 7, operations 700 once started in block 701 determine if there is a call for the VMS user in decision block 702. If the answer is no, decision block 702 is re-executed. If the answer is yes in decision block 702, decision block 703 determines if the VMS user is IM present on any IM system. If the answer is no in decision block 703, block 704 performs normal processing before returning control to decision block 702.

If the answer is yes in decision block 703, an alternative embodiment may execute blocks 706-708 or control may be transferred directly from decision block 703 to block 709. Assuming that the alternative embodiment is implemented, block 706 sends a message to the caller asking if the caller wants the voice messaging system to find the voice messaging user and establish communication between the caller and the VMS user. Decision block 707 then determines the caller's decision with respect to contacting the VMS user. If the answer is no in decision block 707, alternative block 708 allows the caller the option of leaving a voice message for the VMS user before returning control back to decision block 702.

If the decision in decision block 707 is yes, assuming that the alternative embodiment was implemented or the alternative embodiment was not implemented, block 709 requests that a message be sent to the VMS user via the user control. This message requests whether the user wants to communicate with the caller and the format of that possible communication. In addition, the message also identifies for the VMS user the caller.

After execution of block 709, decision block 711 determines if there is a response from the VMS user with the response being received via the user control. If the answer is no, control is transferred to block 716 and information is transmitted to the caller. Then, the caller is allowed the option of leaving a voice message before control is transferred back to decision block 702.

If the answer is yes in decision block 711, decision block 712 examines the response which was communicated via user control to determine if the VMS user wants to communicate with the caller. If the answer is no, control is once again transferred to block 716. If the answer is yes in decision block 712, block 710 transmits to the caller a voice message that defines what format will be used for the caller to respond to the communications from the VMS user.

After execution of block 710, control is transferred to decision block 713 which determines if a non-control message has been received from the VMS user via the user control block. If the answer is no, decision block 1101 of FIG. 11 determines if a terminate control message was received from the VMS user via the user control block. If the answer is yes in decision block 1101, control is transferred to block 716.

If the answer is no in decision block 1101, control is transferred to decision block 1102 of FIG. 11. Decision block 1102 determines if a transfer control message has been received from the VMS user indicating that the VMS user wants the caller transferred to another destination. For example, the VMS user may wish to have the caller transferred to a cellular telephone used by the VMS user. In one embodiment, the identity of the destination is not revealed to the caller. If the answer is no in decision block 1102, control is transferred to decision block 718 of FIG. 7. If the answer is yes, block 1103 sends a message to the caller informing the caller of the transfer and the destination. The message may state that call is being transferred to the VMS user's cellular telephone but not give the telephone number of the cellular telephone. Then, block 1104 sends control messages to the switching system to transfer the caller before returning control to decision block 702 of FIG. 7.

Returning to decision block 713, if a non-control message has been received from the VMS user, block 717 reformats the message for transmission to the caller. The format that the message is re-formatted into was previously discussed with respect to FIGS. 2 and 3.

After execution of block 717 or a "no" result in decision block 1101, decision block 718 determines if a non-control message has been received from the caller. If the answer is yes, the message is reformatted, and a request is made to the user control to transmit the reformatted message to the VMS user before control is transferred back to decision block 713.

If the answer in decision block 718 is no, decision block 721 determines whether a control message has been received from the caller indicating either a timeout or a disconnect. If the answer is yes in decision block 721, block 722 transmits a terminate control message to the VMS user via the user control block before transferring back to decision block 702. If the answer in decision block 721 is no, control is transferred back to decision block 713.

Operations 800 illustrated in FIG. 8 may implement the user control 207 of FIG. 2 or the user control 307 of FIG. 3. After being started in block 801, decision block 802 determines if there is a request from the caller control block to set up an IM session. If the answer is no, control is transferred back to decision block 802. If the answer is yes in decision block 802, block 803 transmits an IM message to the VMS user identifying the caller and the fact that the caller wants to set up communication. In an alternative embodiment, block 804 transmits a message requesting the format to be used in the session from the VMS user. The various formats that may be used were discussed with respect to FIGS. 2 and 3.

Next, decision block 805 determines if there is a response from the VMS user. If the answer is no, information is sent to the caller control block which subsequently informs the caller that there was no response from the VMS user. If the answer is yes in decision block 805, decision block 807 determines if the VMS user wants to establish a session. If the answer is no, control is transferred to block 806 which after execution returns control back to decision block 802. If the answer is yes in decision block 807, control is transferred to decision block 809 or in the alternative to block 808 which transmits the format to be used in the session which had been received from the VMS user to the caller control before transferring control to decision block 809.

Decision block 809 determines if a non-control message had been received from the caller via the caller control block. If the answer is no, decision block 811 determines if it is a terminate control message from the caller control block. If the answer is yes in decision block 811, block 812 transmits a message to the VMS user that the session has been terminated before transferring control back to decision block 802.

Returning to decision block 809, if the answer is yes, block 813 transmits the message to the VMS user before transferring control to decision block 814. The latter decision block determines if there is a non-control message from the VMS user. If the answer was yes, block 818 transmits the message to the caller control block before returning control back to decision block 809.

If the answer in decision block 814 is no, decision block 816 determines if there is a control message indicating that the VMS user has timed out or terminated. If the answer is no, control is transferred to decision block 1106 of FIG. 11. Decision block 1106 determines if a transfer control message has been received from the VMS user. If the answer is yes, block 1107 transmits a transfer control message to the caller control before transferring control to decision block 802 of FIG. 8. If the answer is no, control is transferred to decision block 809 of FIG. 8.

Returning to decision block 816, if the answer in decision block 816 is yes, block 817 transmits a terminate control message to the caller control block before returning control back to decision block 802.

Figure 9:
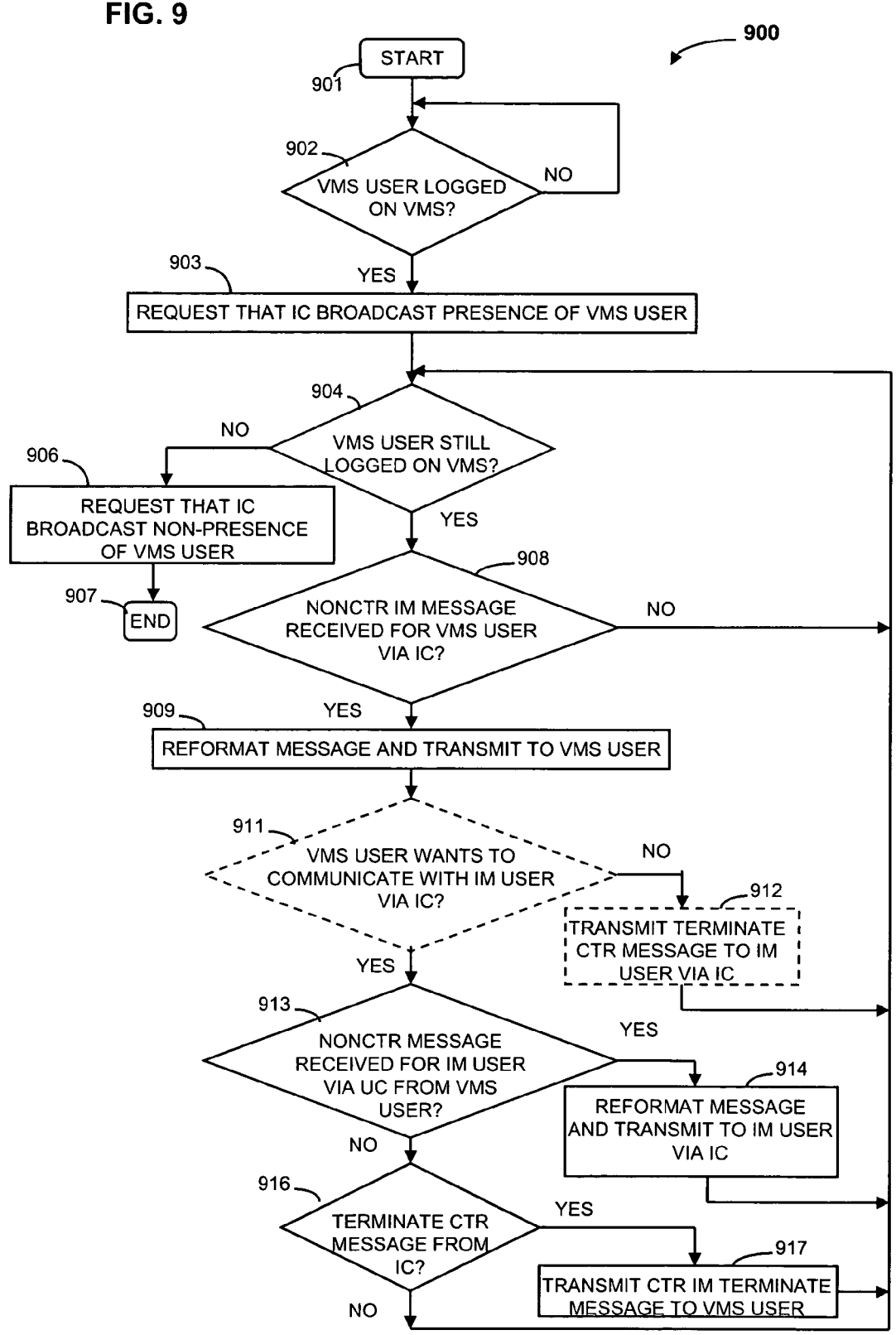
FIGS. 9 and 10 illustrate, in flowchart form, operations performed in the implementation of the embodiments of FIGS. 4-6.

FIG. 9 illustrates, in flowchart form, operations 900 that illustrate in greater detail the embodiments of the user control 406 of FIG. 4 and user control 506 of FIG. 5. User control 606 of FIG. 6 would perform similar operations. After being started in block 901, decision block 902 determines if the VMS user is logged on to the voice messaging system. If the answer is no, control is transferred back to decision block 902. If the answer is yes in decision block 902, block 903 requests that the IM control block broadcast the presence of the VMS user.

Next, decision block 904 determines if the VMS user is still logged on to the voice messaging system. If the answer is no, decision block 906 requests that the IM control block broadcast a non-presence of the VMS user to the IM systems and the execution of the operations 900 are ended by block 907. Note, that user control 606 of FIG. 6 would not execute blocks 903 and 906.

If the answer in decision block 904 is yes, decision block 908 determines if there is a non-control IM message received for the VMS user via the IM control block. If the answer is no, control is transferred back to decision block 904. If the answer is yes, block 909 reformats the message and transmits it to the VMS user.

After execution of block 909, control is transferred to decision block 913 or alternatively to decision block 911 and block 912. Decision block 911 determines if the VMS user wants to communicate with the IM user. If the answer is no, block 912 transmits a terminate control message to the IM user via the IM control block before transferring control back to decision block 904. If the answer is yes in decision block 911, decision block 913 determines if a non-control message has been received for the IM user. If the answer is yes, block 914 reformats the message and transmits the message to the IM user via the IM control block before returning control back to decision block 904.

If the answer is no in decision block 913, decision block 916 determines if there is a terminate control message from the IM control block indicating that the IM user has terminated the session. If the answer is yes, block 917 informs the VMS user that the communication has been terminated before returning control back to decision block 904. If the answer in decision block 916 is no, control is transferred back to decision block 904.

Figure 10:
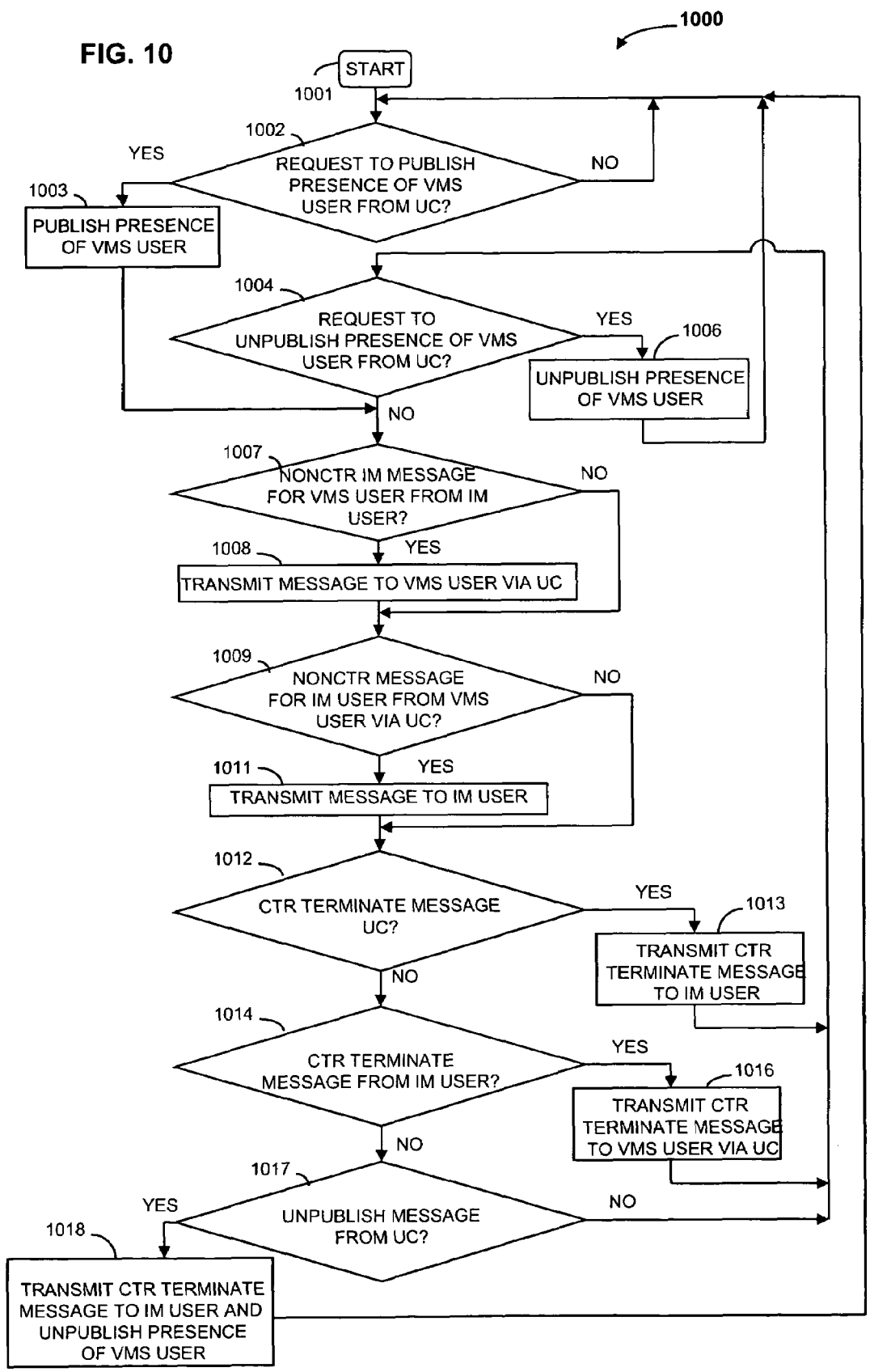

FIG. 10 illustrates operations performed by IM control 407 of FIG. 4 and IM control 507 of FIG. 5. TTY control 607 of FIG. 6 would perform similar operations but would not perform the operations of blocks 1002-1006. After operations 1000 are started in block 1001, block 1002 determines if a request to publish the presence of the VMS user has been received from the user control block. If the answer is no, control is returned back to decision block 1002. If the answer is yes, block 1003 publishes the presence of the VMS user on the IM systems before transferring control to decision block 1007. Decision block 1007 determines if there is a non-control IM message for the VMS user from the IM user. If the answer is no, control is transferred to decision block 1009. If the answer is yes, block 1008 transmits the message to the VMS user via the user control block before transferring control to decision block 1009.

Decision block 1009 determines if there is a non-control message for the IM user from the VMS user received via the user control block. If the answer is no, control is transferred to decision block 1012. If the answer is yes, block 1011 transmits the message to the IM user before transferring control to decision block 1012.

Decision block 1012 determines if there is a control terminate message from the user control block. If the answer is yes, block 1013 transmits a control terminate message to the IM user before transferring control to decision block 1004.

Decision block 1004 determines if the control terminate message received from the user control block was a request to unpublish the presence of the VMS user. If the answer is yes, block 1006 unpublishes the presence of the VMS user before transferring control to decision block 1002. If the answer in decision block 1004 is no, control is transferred to decision block 1007.

Returning to decision block 1014, the latter decision block determines if a control terminate message has been received from the IM user. If the answer is yes, block 1016 transmits a control terminate message to the VMS user via the user control block before returning control to decision block 1004.

If the answer in decision block 1014 is no, decision block 1017 determines if there is an unpublished message from the user control block. If the answer is yes, block 1018 transmits a control terminate message to the IM user and unpublishes the presence of the VMS user before returning control back to decision block 1002.

When the operations of voice mail system 103 are implemented in software, it should be noted that the software can be stored on any computer-readable medium for use by or in connection with any computer related system or method. In the context of this document, a computer-readable medium is an electronic, magnetic, optical, or other physical device or means that can contain or store a computer program for use by or in connection with a computer related system or method. The software can be embodied in any computer-readable medium for use by or in connection with an instruction execution system, apparatus, or device such as a computer-based system, processor-containing system, or other system that can fetch the instructions from the instruction execution system, apparatus, or device and execute the instructions. In the context of this document, a "computer-readable medium" can be any means that can store, communicate, propagate, or transport the program for use by or in connection with the instruction execution system, apparatus, or device. For example, the computer-readable medium can be, but is not limited to, an electronic, magnetic, optical, electromagnetic, infrared, or semiconductor system, apparatus, device, or propagation medium. More specific examples (a nonexhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM, EEPROM, or Flash memory) (electronic), and a portable compact disc read-only memory (CDROM).

In an alternative embodiment, where voice mail system 103 is implemented in hardware, voice mail system 103 can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

Of course, various changes and modifications to the illustrated embodiments described above would be apparent to those skilled in the art. Such changes and modifications can be made without departing from the spirit and scope of the invention and without diminishing its intended advantages. It is therefore intended that such changes and modifications be covered by the following claims except in so far as limited by the prior art.

What is claimed is:

1. A method for providing communication for a user of a multi-media messaging system with a plurality of instant messaging systems via the multi-media messaging system, comprising the steps of:
   - detecting by the multi-media messaging system the user accessing multi-media messages stored on the multi-media messaging system;
   - broadcasting by the multi-media messaging system a presence of the user on the multi-media messaging system in response to the detection to the plurality of instant messaging systems; and
   - establishing by the multi-media messaging system instant messaging communication between a person using one of the plurality of instant messaging systems and the user via the multi-media messaging system.

2. The method of claim 1, wherein the step of broadcasting comprises the step of transmitting the presence of the user by the multi-media messaging system to a presence server.

3. The method of claim 1, wherein the step of establishing comprises the step of inquiring if the user wants to establish instant messaging communication.

4. The method of claim 1, wherein the step of establishing comprises the step of converting information received from the user into instant messaging messages for transmission to the person.

5. The method of claim 4, wherein the received information is voice information.

6. The method of claim 5, comprises the step of converting the voice information to text information for transmission to the person.

7. The method of claim 5, comprises the step of encoding the voice information into encoded audio files for transmission to the person.

8. The method of claim 4, wherein the received information is dialing signaling information.

9. The method of claim 4, wherein received information is in a short message signaling format.

10. The method of claim 4, wherein received information is in a TTY signaling format.

11. The method of claim 1, wherein the step of establishing comprises the step of converting instant messaging messages received from the person into voice information for transmission to the user.

12. An apparatus for implementing the method of claim 1.

13. A computer-readable medium for providing communication for a user of a multi-media messaging system with a plurality of instant messaging systems via the multi-media messaging system, storing computer-executable instructions configured for:
   detecting by the multi-media messaging system the user accessing multi-media messages stored on the multi-media messaging system;
   broadcasting by the multi-media messaging system a presence of the user on the multi-media messaging system in response to the detection to the plurality of instant messaging systems; and
   establishing by the multi-media messaging system instant messaging communication between a person using one of the plurality of instant messaging systems and the user via the multi-media messaging system.

14. The computer-readable medium of claim 13, wherein the computer-executable instructions for broadcasting comprises computer-executable instructions for transmitting the presence of the user by the multi-media messaging system to a presence server.

15. The computer-readable medium of claim 13, wherein the computer-executable instructions for establishing comprises computer-executable instructions for inquiring if the user wants to establish instant messaging communication.

16. The computer-readable medium of claim 13, wherein the computer-executable instructions for establishing comprises computer-executable instructions for converting information received from the user into instant messaging messages for transmission to the person.

17. The computer-readable medium of claim 16, wherein the received information is voice information.

18. The computer-readable medium of claim 17, storing the computer-executable instructions for converting the voice information to text information for transmission to the person.

19. The computer-readable medium of claim 17, storing the computer-executable instructions for encoding the voice information into encoded audio files for transmission to the person.

20. The computer-readable medium of claim 16, wherein the received information is dialing signaling information.

21. The computer-readable medium of claim 16, wherein received information is in a short message signaling format.

22. The computer-readable medium of claim 16 wherein received information is in a TTY signaling format.

23. The computer-readable medium of claim 13, wherein the computer-executable instructions for establishing comprises it is computer-executable instructions for converting instant messaging messages received from the person into voice information for transmission to the user.

\* \* \* \* \*